US012183151B2

(12) United States Patent
Jessome

(10) Patent No.: US 12,183,151 B2
(45) Date of Patent: Dec. 31, 2024

(54) METHODS AND SYSTEMS FOR CONDUCTING GAMES OF CHANCE

(71) Applicant: 4352286 Nova Scotia Limited, Sydney (CA)

(72) Inventor: Michael Patrick Jessome, Fredericton (CA)

(73) Assignee: 4352286 Nova Scotia Limited, Sydney (CA)

( * ) Notice: Subject to any disclaimer, the term of this patent is extended or adjusted under 35 U.S.C. 154(b) by 271 days.

(21) Appl. No.: 17/870,240

(22) Filed: Jul. 21, 2022

(65) Prior Publication Data

US 2023/0028707 A1 Jan. 26, 2023

Related U.S. Application Data

(60) Provisional application No. 63/224,718, filed on Jul. 22, 2021.

(51) Int. Cl.
*G07F 17/32* (2006.01)

(52) U.S. Cl.
CPC ................................ *G07F 17/3227* (2013.01)

(58) Field of Classification Search
CPC ............................. G07F 17/32; G07F 17/3227
See application file for complete search history.

(56) References Cited

U.S. PATENT DOCUMENTS 8,333,645 B2 12/2012 Xidos et al.
8,622,821 B1 * 1/2014 Coronel ................ A63F 13/355 463/25
2002/0049082 A1 * 4/2002 Bansemer ........... G07F 17/3286 463/20
2008/0139306 A1 * 6/2008 Lutnick .................. G06Q 30/02 463/30
2014/0295944 A1 10/2014 Faircloth

FOREIGN PATENT DOCUMENTS

GB 2395137 A 5/2004
WO 2016/200746 A 12/2016

OTHER PUBLICATIONS

Notification of Transmittal of the International Search Report and the written opinion issued by the International Searching Authority for International Patent Application No. PCT/US22/37873, mailed on Oct. 28, 2022.

* cited by examiner

*Primary Examiner* — Kevin Y Kim
(74) *Attorney, Agent, or Firm* — Myers Wolin, LLC

(57) ABSTRACT

A computer-based method is provided for conducting games of chance. The method includes first defining a target overall house advantage for a game of chance having multiple instances of randomized gameplay. The method then defines a first potential game results set for generating randomized results defining a house advantage greater than the target overall house advantage and a second potential game results set for generating randomized results defining a house advantage less than the target overall house advantage. The method then determines a position of a user in the context of the game of chance and defines one of the potential game results sets as active based on the position of the user. Upon receiving instructions from the user to initiate an instance of the random gameplay, the method returns a result of the instance of the randomized gameplay based on the active potential game results set.

21 Claims, 11 Drawing Sheets

METHODS AND SYSTEMS FOR CONDUCTING GAMES OF CHANCE

CROSS-REFERENCE TO RELATED APPLICATION

This application takes priority from U.S. Provisional Patent Application No. 63/224,718 filed Jul. 22, 2021, the contents of which are incorporated by reference herein in their entirety.

FIELD OF THE INVENTION

The invention relates to methods and systems for conducting games of chance.

BACKGROUND

A fair game means that betting participants will generally win back the total of all their bets in a reasonable amount of time. To meet such a condition, the first criteria that must be met is that the RTP or "Return to Player" value of the game that accepts wagers is equal to 100%. A simple game that has a 100% RTP is a double-or-nothing coin toss game that returns 2× a wager for each correct call of a coin flip. The RTP formula for such a game is simply 50% (the odds of a correct guess)*2 (the prize)=100% (the RTP).

While this example of a game may seem overly simple, it is a game, and all games that allow for wagers, despite their multitude of variations, evaluate RTP in a similar manner. The inverse of RTP, which expresses the perspective of the operator of the game, is called HA or "House Advantage." HA is simply 100% minus the RTP. In the double-or-nothing coin toss game described, the HA would be 0%. Gambling games typically maintain a positive HA, which is often set by a state's jurisdiction and can be any range of values within reason, for example, between 10% to 5% HA or, from the player's perspective, between 90% to 95% RTP.

More than any other factor, it is the size of the HA that determines how profitable a game will be for the house over time. There is, however, a misconception among players (and maybe even operators) that HA is an expression of the expected loss of all wagers combined or that RTP is an expression of the expected win of all wagers combined. For example, when playing a 95% RTP game players might falsely assume that if they wager $1,000 in small bets of $1, they should expect a loss of 5% or to be down $50. This consideration, however, does not reflect a game's volatility which plays a very important role in the win-lose cycle. In truth, the more bets players make on a game with a positive house advantage, the deeper the hole becomes that they dig for themselves.

FIG. 1 shows an envelope for a set of potential outcomes for a game of chance. In the graph shown in FIG. 1, the envelope 100 shown illustrates the effects and consequences of engaging with a traditional game of chance that maintains a positive house advantage. The game represented in FIG. 1 has a typical 5% house advantage, and a standard deviation of 5.15. The middle line 110 illustrates the expected value of each wager placed, which, from the first wager placed is reduced by 5% and then compounded in repeated trials.

The formula for the expected value 110, or profit line is simply the HA*wager*n (where n is the number of trials and HA is the house advantage). The "lower" and "upper" lines 120, 130 express the game's volatility at a confidence interval of 95%. These upper and lower confidence bands 120, 130 conform to the normal distribution and express the range of outcomes around the profit line 110 or the mean at any given interval, thereby forming an envelope for potential results expressed with a 95% confidence interval.

In simulations, a result after n trials is simply obtained by subtracting the sum of all wins minus the sum of all wagers (total wins−total bets=profit). The slope of the middle line 110 indicates the expected rate of decay without considering the game's volatility. From the player's perspective and the house's, the most important line on this graph is the upper confidence band 130 because it indicates the only section of the graph that is above the breakeven value of zero where a player may win or the house may lose money. Note that after 40,681 games 140, however, the player who has placed that many wagers has an almost 0% chance of breaking even. After 40,681 games 140 the game's volatility and its RTP (or return to player value) are significantly overcome, and all profits from that point on are predicted to go to the house.

FIG. 2 shows an envelope for a set of potential outcomes for a game of chance with parameters different than that of FIG. 1. As shown, the graph of FIG. 2 provides an RTP value of 100% and therefore a house advantage of 0%. This results in a very different outcome and illustrates a more balanced situation. Where there is no house advantage, such as in the case of a coin toss game, neither side maintains an advantage.

Therefore the expected value 200, or profit, from wagers remains neutral, at zero. However, when upper and lower confidence bands 210, 220 are added to the graph, they illustrate that those lines create an expanding envelope of potential outcomes at a 95% confidence interval. The lines shown expand by a factor of $\sqrt{n}$, where n=total trials. As such, the simple implementation of 0% house advantage would result in an unpredictable system that could result in high losses for either the house or the player after enough repeated trials.

FIGS. 3A and 3B show sets of potential outcomes for different games falling within corresponding envelopes similar to the envelope 210, 220 of FIG. 2. As shown, FIG. 3A shows the behavior of five randomized simulations in the context of a game of slots having a standard deviation of 6. As shown, while a user might expect that each of these simulations would stay near the expected value line 200, in reality they never would. Accordingly, the lowermost simulation 300 in FIG. 3A remains negative for almost the entire period, while the uppermost simulation 310 is in a continual winning situation.

From both perspectives, five million wagers placed could translate into serious losses that may never be regained (either by a user or by the system). Since there is no "growth" or "decay" in this model, a 0% HA has no influence over these lines reaching a breakeven point. Such a system would therefore be highly unpredictable.

This remains true for all games at 100% RTP or 0% house advantage. FIG. 3B shows the results for a similar setup in the context of a coin flipping game which would have a very modest standard deviation of 1.

The unpredictability of these results, which can't be known at the onset, means that 100% RTP games are not implemented in practice and cannot be sustained in the real world. Despite having 0% house advantage overall, players may end up in a continual negative condition, where their total losses are too great to be overcome or, conversely, their total wins are too great to be lost, i.e., drop below the sum of their total bets. One way to ensure that players will always get back what they wager is to eliminate volatility from the system, but volatility is what makes a game enjoyable. A full-payback game without volatility would be one where the bet is just continually passed back and forth between the player and the house.

There is a need for a fair play model for a game of chance that results in predictability for individual players and for a system as a whole without eliminating volatility of outcomes for instances of such a game of chance.

SUMMARY

In some embodiments, a computer-based method is provided for conducting games of chance. The method includes first defining a target overall house advantage for a game of chance, the game of chance having multiple instances of randomized gameplay.

The method then defines a first potential game results set for generating randomized results defining a house advantage greater than the target overall house advantage and a second potential game results set for generating randomized results defining a house advantage less than the target overall house advantage.

The method then determines a position of a user in the context of the game of chance and defines one of the first potential game results set and the second potential game results set as active based on the position of the user. Then, upon receiving instructions from the user to initiate an instance of the random gameplay, the method returns to the user a result of the instance of the randomized gameplay based on the active potential game results set.

In some embodiments, the method further includes repeatedly determining the position of the user in the context of the game of chance and defining one of the potential game results set as active based on the position of the user. The method then receives instructions from the user to initiate an instance of the randomized gameplay, and returns to the user a result of the instance of the randomized gameplay based on the active potential game results set. The result of the instance of the randomized gameplay then impacts the position of the user.

In some such embodiments, for a subset of iterations of gameplay initiated based on instructions from the user, the active potential game results set is selected based on a relationship between a system balance and the target overall house advantage. In some such embodiments, the subset of iterations constitutes every nth iteration, where n is a variable defined prior to initiation of an instance of the randomized gameplay.

In some embodiments, the target overall house advantage is 0%.

In some embodiments, the user has an overall balance, and the user's position within the context of the game of change is based on whether the user's overall balance is positive or negative. In some such embodiments, the first potential game results set is defined as active when, upon determining the position of the user, the user's overall balance is positive, and the second potential game results set is defined as active when, upon determining the position of the user, the user's overall balance is negative.

In some such embodiments, the active game results set is changed only when the user's overall balance is positive or negative by more than a threshold amount and where the active game results set previously defined is different than the active game results set indicated by the user's current balance.

In some embodiments, the method provides a subscription based service. In such embodiments, the method includes receiving a subscription fee from the user prior to receiving instructions from the user to initiate an instance of the randomized gameplay. The method then provides access to the user at a user interface through which the user can submit instructions to initiate an instance of the randomized gameplay only when the user has an active subscription.

In some such embodiments, the method includes receiving funds from the user for an account associated with the user. Funds from the account are then used by the user for wagering on instances of the randomized gameplay. Funds in the account in such embodiments are independent of the subscription fee. In such embodiments, the target overall house advantage may be 0%.

In some embodiments, the method defines a third potential game results set for generating randomized results defining a house advantage corresponding to the target overall house advantage. In such embodiments, the method may initially define the third potential game results set as active prior to the user having a position within the context of the game, such as upon a user's first instance of initiating gameplay. In some such embodiments, the third potential game results set is defined as active where the user's overall balance is positive or negative by less than a threshold amount.

In some embodiments, the first potential game results set defines a house advantage greater than the target overall house advantage by a first amount and the second potential game results set defines a house advantage less than the target overall house advantage by a second amount different than the first amount.

In some embodiments, each of the potential game results sets is a formula for determining outcomes of an instance of the game of chance. In some, alternative, embodiments, each of the potential game results sets is an array or matrix of potential outcomes for an instance of the game of chance. A result is then selected randomly from the array or matrix.

Also provided is a gaming system for providing access to a game of chance. The system includes a user interface device through which a user may access a game of chance. The game of chance comprises multiple instances of a randomized gameplay. The system also includes a memory for storing instructions for implementing the game of chance. The system also includes a database containing a plurality of potential gam results sets for the instances of the randomized gameplay, such database may be stored in the memory.

The system also includes a processor for implementing the game of chance based on the instructions stored in the memory and for generating a randomized outcome for each instance of the randomized gameplay based on one of the plurality of potential gam results sets.

The game of chance has a target overall house advantage, and each of the plurality of potential game results sets generates a randomized result for particular instances of the randomized gameplay of the game of chance, such that a first of the plurality of potential game results sets generates randomized results defining a house advantage greater than the target overall house advantage, and a second of the plurality of potential game results sets generates randomized results defining a house advantage less than the target overall house advantage.

The user has a position within the context of the game of chance, and one of the plurality of potential game results sets is defined as active based on the user's position. For each instance of the randomized gameplay initiated from the user interface device, the processor then implements the game of chance based at least partially on the active potential game results set at the time at which the instance is initiated.

In some embodiments, the target overall house advantage is 0%.

In some embodiments, the user's position within the context of the game of chance is based on whether the user's overall balance is positive or negative. The first potential game results set may then be defined as active when the user's overall balance is positive and the second potential game results set is defined as active when the user's overall balance is negative.

In some embodiments, for a subset of instances of randomized gameplay, the potential game results set is selected based on a relationship between a system balance and the target overall house advantage.

In some embodiments, the user is provided access to the game of chance at the user interface only if the user has an active subscription to a service implementing the game of chance. The game of chance may then accept wagers for instances of the randomized gameplay from a user account independent of a fee for maintaining an active subscription.

In some embodiments, each of the plurality of potential game results sets is a formula for determining outcomes of an instance of the game of chance and the result is determined based on the formula. In some alternative embodiments, each of the plurality of potential game results sets is an array or matrix of potential outcomes for instances of the game of chance, and a result is selected randomly from the array or matrix.

DETAILED DESCRIPTION OF THE PREFERRED EMBODIMENTS

Figure 1:
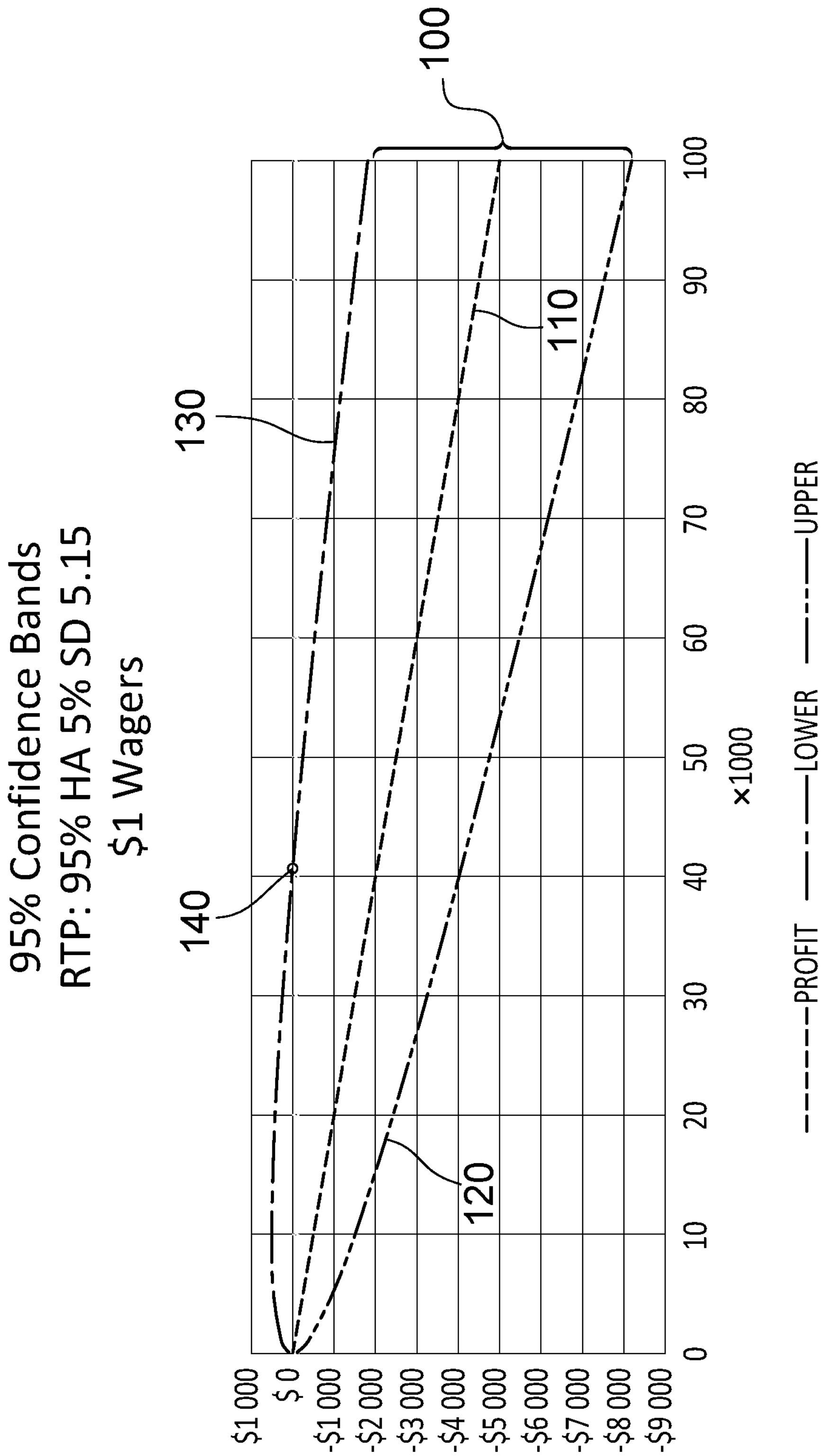
FIG. 1 shows an envelope for a set of potential outcomes for a game of chance.
Figure 2:
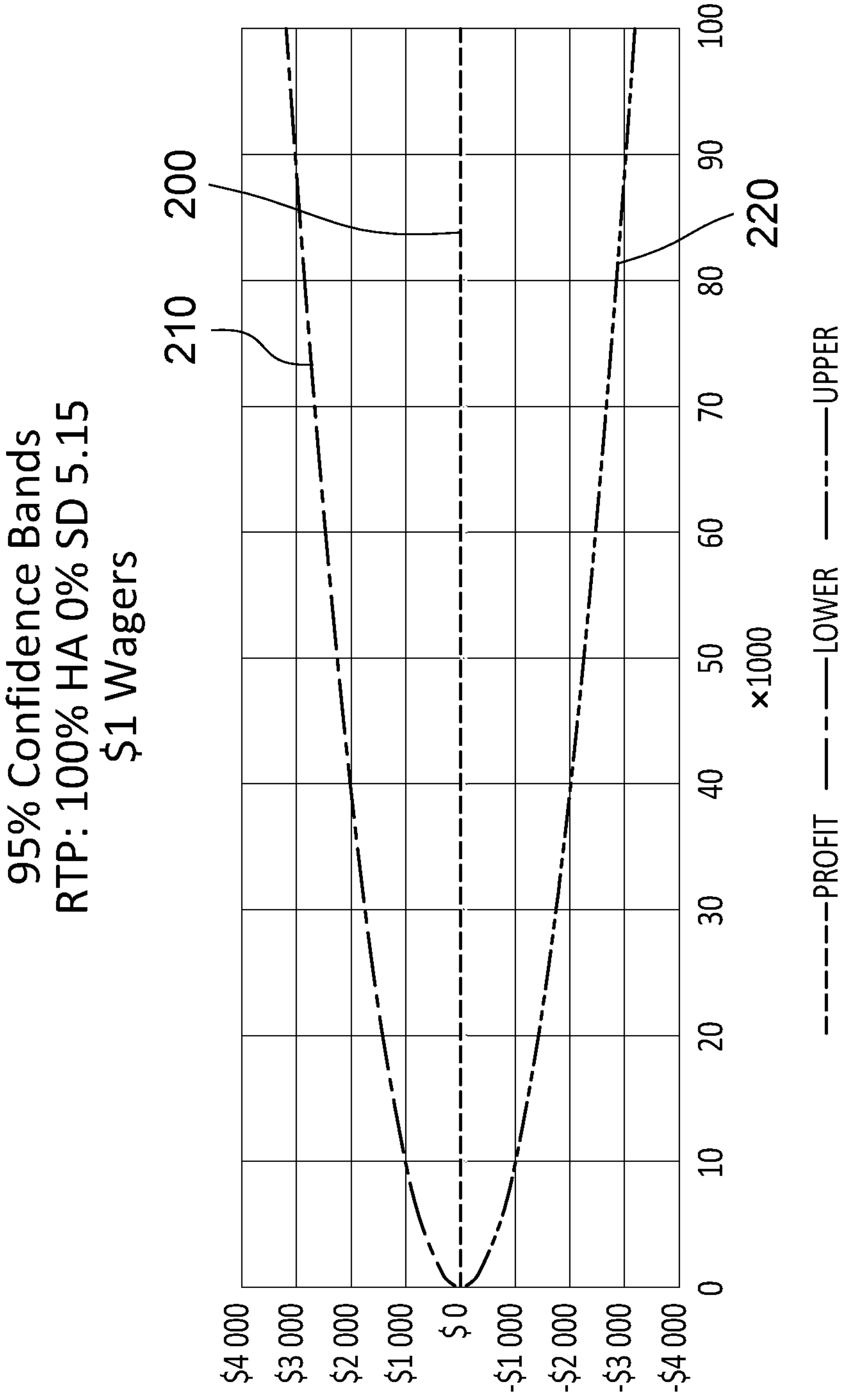
FIG. 2 shows an envelope for a set of potential outcomes for a game of chance with parameters different than that of FIG. 1.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

This disclosure generally discusses methods for conducting games of chance as well as systems for providing access to such games of chance. The games of chance discussed herein generally comprise multiple instances of a randomized gameplay. Accordingly, a user may play an instance of a game with a randomized or partially randomized outcome, such as flipping a coin or playing a virtual slot machine or roulette wheel. The instances of the games may take additional forms as well, such as a poker game, a different reel-based game, or a number game such as keno, among others. The game of chance would then include multiple instances of such individual gameplay events.

The games of chance discussed herein are generally virtual games accessed through a user's interface device, as discussed herein. The various instances of gameplay that combine to create the game of chance described herein may be multiple instances of the same gameplay, or they may be instances of distinct games selected by a user. For example, a user may be provided with access to a variety of games within a game of chance platform, and the user may then select one of those games for each instance of the game of chance.

A house advantage, as used herein, typically refers to the sum of all profits of a system operator, expressed in terms of percentage of currency, or currency equivalent, wagered on games within an implementing system. In contrast, a measure of funds returned to a player, or RTP, represent total wins for a player relative to total wagers placed by that player.

As discussed above, if a volatile game with 0% house advantage were provided without further modification, the results would be a fair game, in the sense that losses by the house and by a user or player of the game would be equally likely, but it would be wholly unpredictable for the user and for the system as a whole. Accordingly, in order to create a fair game at a target house advantage, such as 0%, designed such that the users of the game continually cross a breakeven point, or a predicted point for a given house advantage, a method of volatility management is introduced into the system to pivot the flow of wins and losses around the desired RTP or house advantage. Such an approach allows for volatility within the system while still managing overall results.

In order to implement such a game, the systems and methods described herein define distinct periods of advantage during which an observed RTP or house advantage is directed towards a target RTP or house advantage. To do this, at least two different versions of a game of chance being implemented are used, where each version of the game is designed with a different RTP or house advantage.

Figure 4:
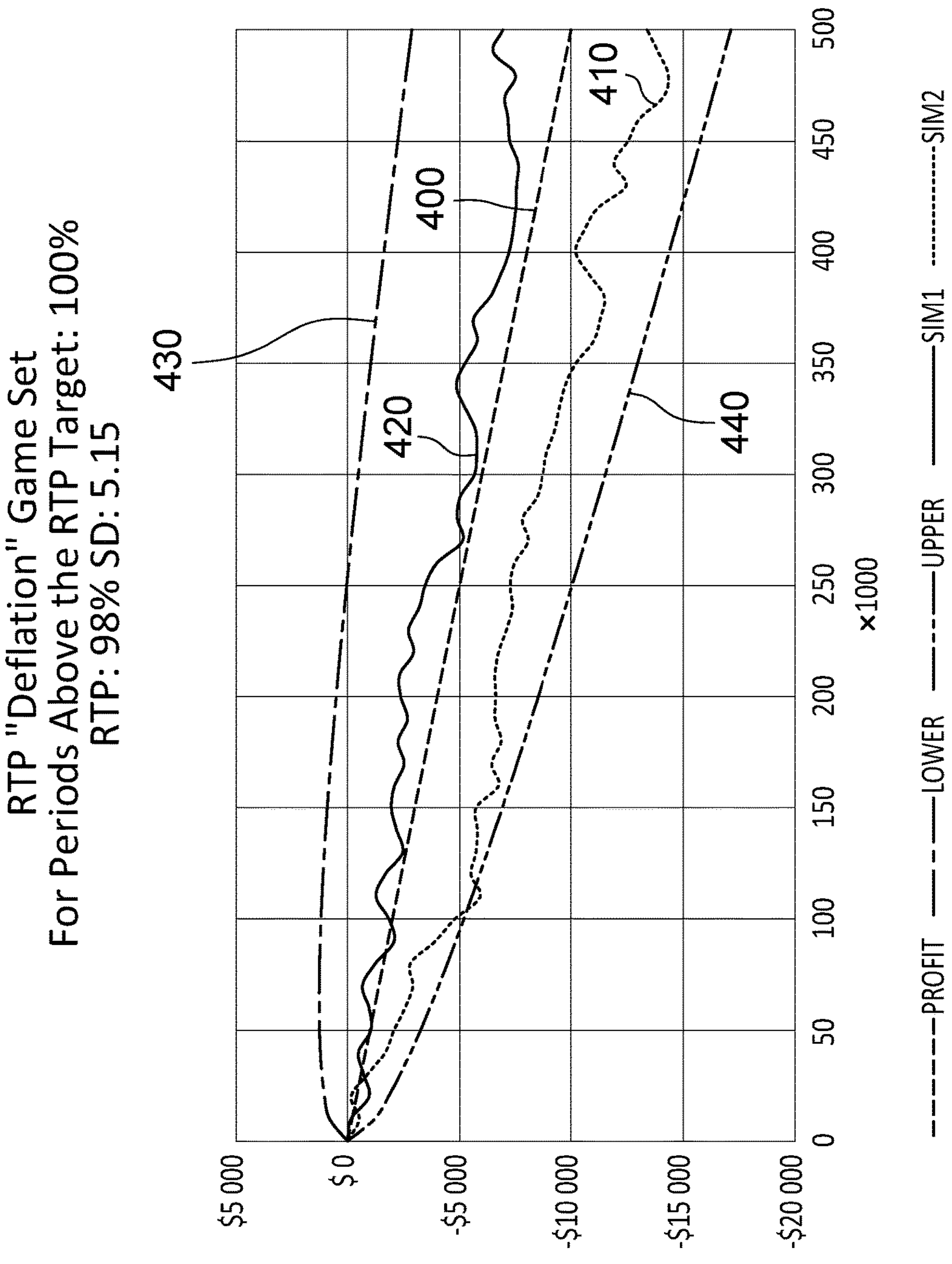
FIG. 4 shows a set of potential outcomes within an envelope for a first potential game results set in accordance with this disclosure.
Figure 5:
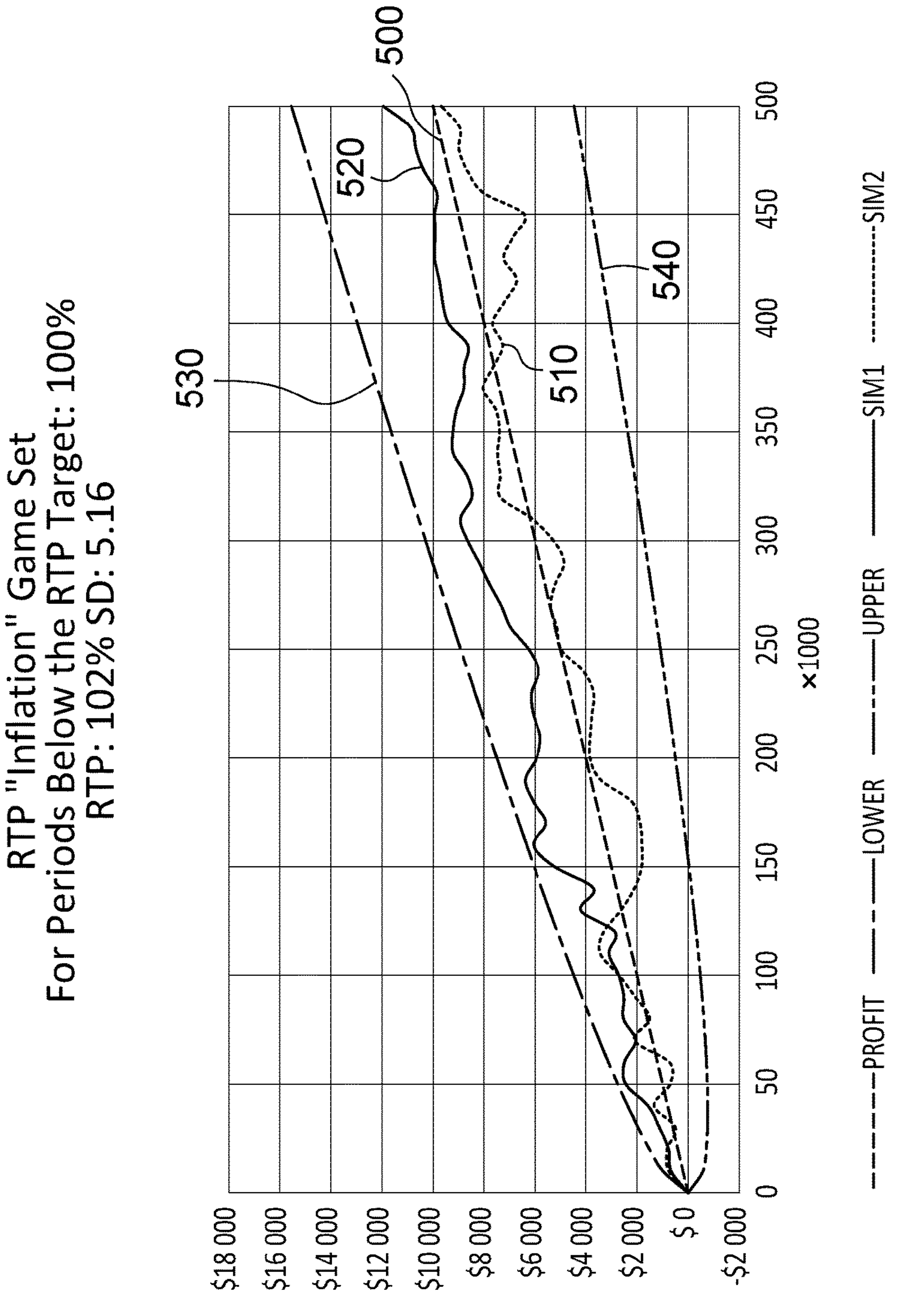
FIG. 5 shows a set of potential outcomes within an envelope for a second potential game results set in accordance with this disclosure.

FIG. 4 shows a set of potential outcomes within an envelope for a first potential game results set in accordance with this disclosure. FIG. 5 shows a set of potential outcomes within an envelope for a second potential game results set in accordance with this disclosure. As shown, the potential game results set of FIG. 4 has a positive house advantage, resulting in an expected value 400 for wagers that decays over time, as in a traditional game with a given house advantage. Accordingly, while different participants within the system 410, 420 may stray within an envelope defined by an upper and lower confidence band 430, 440 of the results, they would still be expected to decay over a long enough time period. This is true even with a house advantage closer to 0% than in a traditional game. As such, the graph of FIG. 4 shows the results of a game implemented with only a 2% house advantage.

Similarly, FIG. 5 shows a set of potential outcomes having a negative house advantage. This results in an expected value 500 that inflates over time. Such a negative house advantage would not be implemented in a traditional game of chance context, since it would result in a loss for a system administrator implementing such a system. As shown, participants within such a system 510, 520 may stray within an envelope defined by an upper and lower confidence band 530, 540, but they would still be expected to inflate over a long enough time period.

Accordingly, a system and method as described herein may switch between different sets of potential game results in order to control inflation and deflation of funds within a user's account. This allows the system and method to keep a user, or player, of such a game of chance close to a break even point even if the volatility of each instance of the game remains in a range typical for such games of chance.

As further discussed herein, the platform may be a subscription-based service, such that a user pays an access fee to participate in the game of chance. The user may then have a separate user account balance independent of any subscription fees representing the user's position within the context of the gameplay. For example, if the user's current account balance is greater than the user's deposits into that account balance, the user has a positive balance, and the user's current balance is less than the user's total deposits into that account balance, the user has a negative balance.

By collecting a subscription fee in order to provide profit to system administrators and to pay overhead, a system administrator may then be able to forego profit in the game of chance itself by setting a house advantage to 0%. This would be possible only if the results of setting the house advantage to 0% were made predictable as made possible by the system and method described herein.

Figure 6:
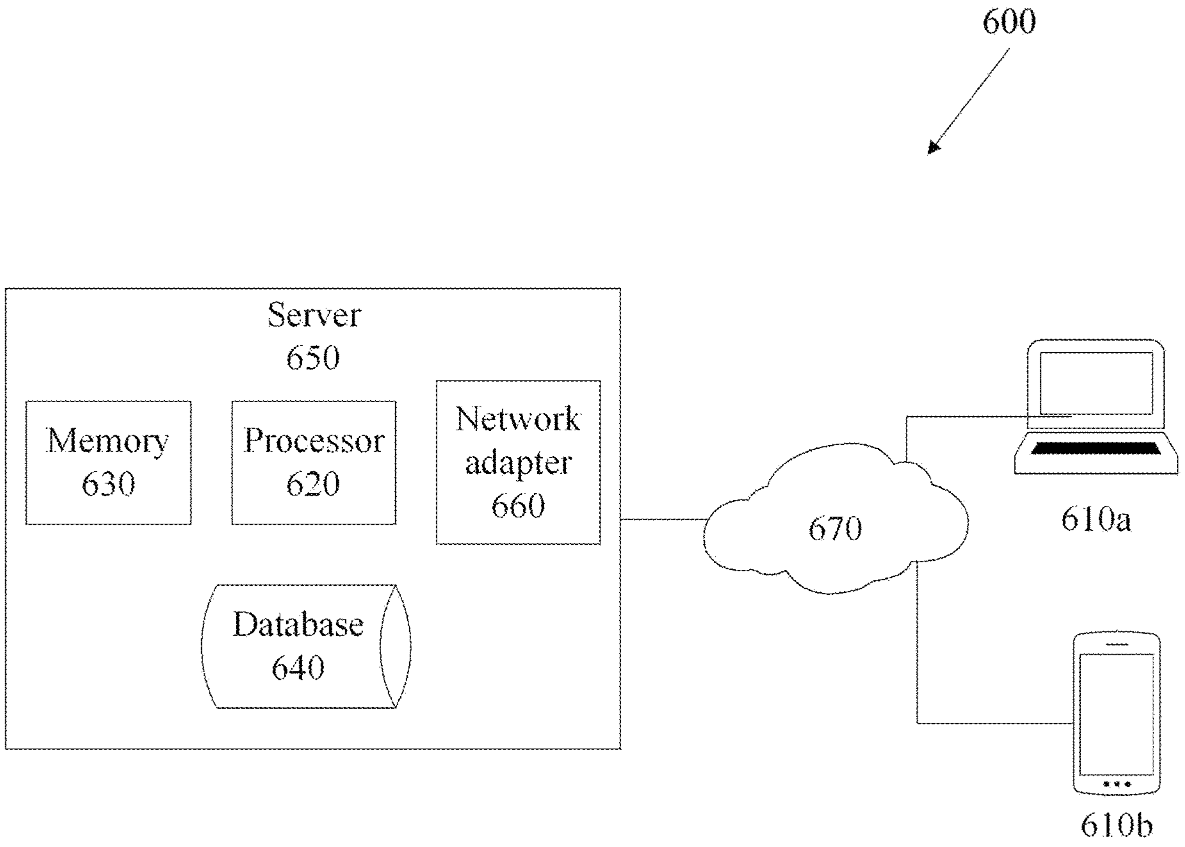
FIG. 6 is a gaming system for providing access to a game of chance.

FIG. 6 shows a gaming system 600 for providing access to games of chance. As shown, the gaming system 600 may generally include a user interface device, such as a computer 610*a* or a smartphone 610*b*, through which a user may access a game of chance. The game of chance may be a single game or type of game, such as a coin flip simulator or a virtual slot machine. The game of chance generally comprises multiple instances of a randomized gameplay. Accordingly, where the game of chance is a virtual slot machine, each pull of a virtual lever would be an instance of the randomized gameplay. The game of chance may, in the alternative, be a platform offering a user multiple distinct games, each of which can be selected for any particular instance of the randomized gameplay.

The system 600 further comprises a memory 630 for storing instructions for implementing the game of chance and a database 640 containing a plurality of potential game results sets for the instances of randomized gameplay. A potential game results set would typically define an outcome for any instance of randomized gameplay initiated while that game results set is active. Accordingly, when a user initiates a virtual game of slots by pulling a virtual lever, the results of that pull would be defined by an active game results set.

Such a game results set may be a table indicating potential results from which a specific result is selected randomly or formulaically. Accordingly, results may be presented as an array or a matrix, or any other format in which options for randomized results may be presented, from which results are drawn.

Alternatively, a game results set may be a formula or software routine used to generate a specific result from a random variable. Such potential game results sets may be tuned or configured to generate neutral results, such as those results shown in FIGS. 3A and 3B, or they may be tuned or configured to generate deflationary or inflationary results over time, such as those shown in FIG. 4 or 5.

The system 600 may further comprise a processor 620 for implementing the game of chance based on instructions stored in the memory 630 and generating a randomized outcome for each instance of the randomized gameplay based on one of the plurality of potential game results sets in the database 640. The processor 620, memory 630, and database 640 may be incorporated into a server 650, or they may be otherwise distributed. Where the components are located within a server 650, the server may be provided with a network adapter 660.

Similarly, the database 640, or a separately connected database, may maintain user information, such as a subscription status or an account balance. Such information may be accessible by a method implementing a game of chance on the system 600 described.

A user interface device 610*a*, 610*b* may then access the server 650 through a network 670, such as the internet, by way of the network adapter 660. As such, the games may be accessed by way of a website or an application in communication with the server 650. Alternatively, the system may be implemented in different ways. For example, the processor operating the game may be installed on the user's interface device 610*a*, 610*b*, such that the memory 630 storing instructions for implementing the game is locally installed. The game may then be embodied in a software application, and the database 640 may be local, on a server accessed by way of the internet 650, or various game components may be distributed in a cloud system.

Figure 7:
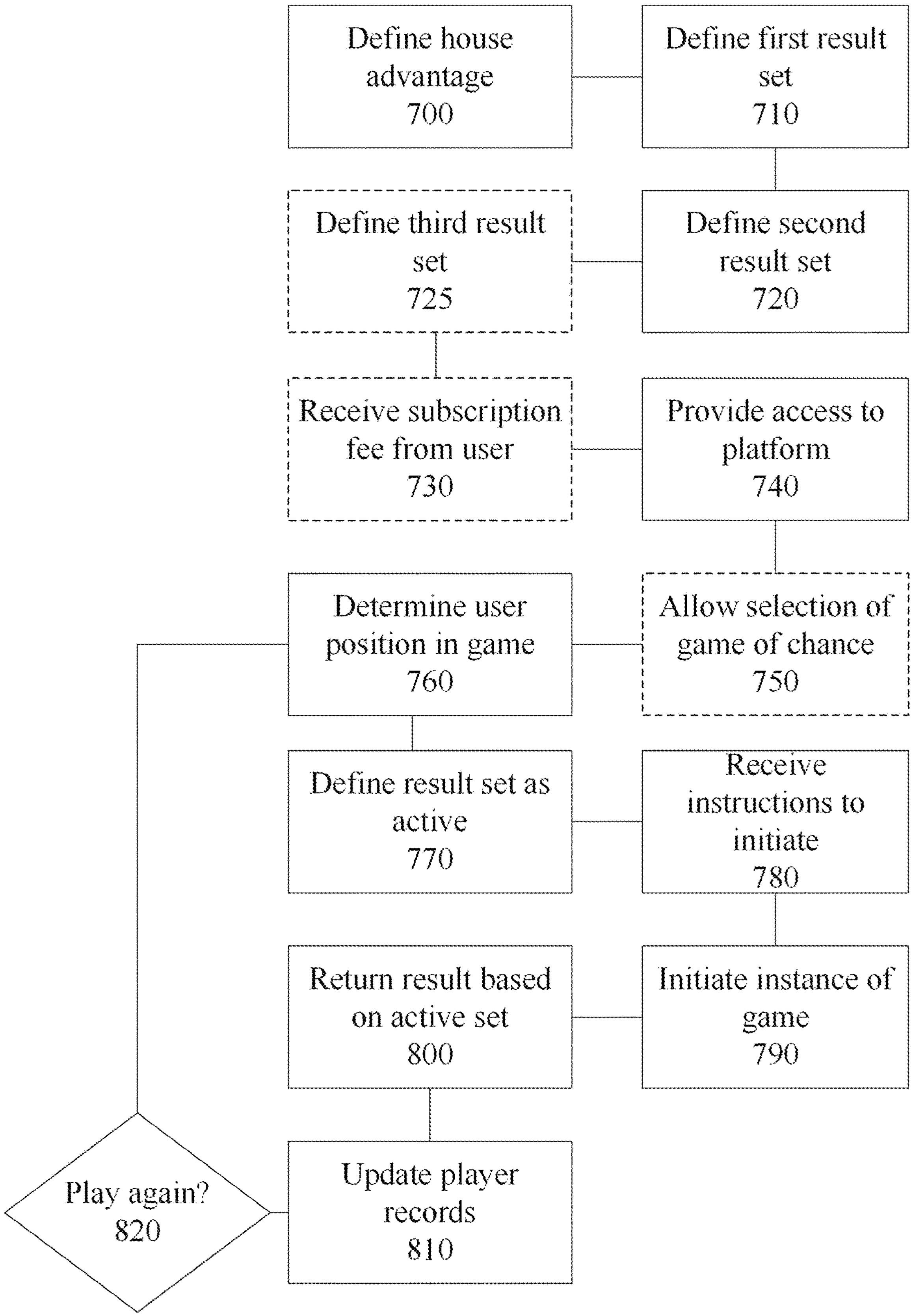
FIG. 7 is a flowchart illustrating a method for conducting a game of chance.

FIG. 7 is a flowchart illustrating a method for conducting a game of chance in accordance with this disclosure. The method may be implemented on the system 600 discussed above with respect to FIG. 1, or it may be implemented on any appropriate computer system.

As shown, the method may first define a target overall house advantage for a game of chance to be implemented (at 700). As discussed above, the game of chance typically comprises multiple instances of a randomized gameplay. Such instances may be multiple instances of the same gameplay, such as a virtual slot machine, or it may be multiple instances of varied types of gameplay. Similarly, the multiple instances may be on similar types of gameplay but within different individual games, such as virtual slot machines having different themes. Such games may provide different levels of volatility and potential outcomes may be represented by different odds.

In some implementations, the target overall house advantage is 5% or 2%, resulting in an RTP of 95% or 98% respectively, and in such an implementation, the odds for instances of gameplay within the game of chance would be tuned such that over a large enough set of instances of gameplay, the system operator would win 5% or 2% of all currency wagered. If outcomes of the instances of gameplay are binary, such as in the context of a coin flipping game, this would be by skewing the expected outcomes such that the house wins an additional 5% of instances. If outcomes of the instances of gameplay have different values, such as in the context of a virtual slot machine, the outcomes can be tuned in more subtle ways to generate a desired house advantage.

In some embodiments, the target overall house advantage may be set to 0%, resulting in 100% of wagered funds being returned to players, or users, of the game of chance. In such a scenario, any income to be generated for a system operator of the system 600 implementing the gameplay would come from a source other than wagers. As discussed above and below, such income may then come from subscription fees collected from users.

Once the target overall house advantage for the game of chance is defined (at 700), the method defines a first potential game results set (at 710) for generating randomized results defining a house advantage greater than the target overall house advantage. A second potential game results set is then defined (at 720) for generating randomized results defining a house advantage less than the target overall house advantage. Examples of the outcome of such potential game results sets are shown in FIGS. 4 and 5 respectively.

Accordingly, where the target overall house advantage is defined to be 0%, the first potential game results set may define a 2% or 5% house advantage while the second potential game results set may define a −2% or −5% house advantage.

Similarly, where the target overall house advantage is defined to be 5%, the first potential game results set may define a 7% house advantage and the second potential game results set may define a 3% house advantage. It is noted that while 0%, 2%, and 5% overall target house advantages are discussed, and while the first and second potential game results sets are defined as the overall target house plus or minus 2% or 5%, a wide variety of house advantages are contemplated, and a wide variety of offsets relative to those house advantages are contemplated.

In some embodiments, a third result set may be defined (at 725). Such a third results set may be equal to the target overall house advantage for the game of chance, and may be initially defined as the active results set.

As discussed, in some embodiments of the games of chance discussed herein, a subscription fee may be collected from a user. Accordingly, in such embodiments, the method may then receive a subscription fee from a user (at 730) after which the user may be authorized to access a platform implementing the games of chance. Such a subscription fee may allow system operators to supplement earnings from a relatively low target overall house advantage, or such a subscription fee may allow system operators to set the target overall house advantage to zero while still earning profit from operating the system. As noted above, such a subscription fee may be paid to a system operator independent of a user's account balance. Accordingly, while a user's account balance may be funded and used to place wagers on games of chance, such an account balance would not consider or include any subscription fees paid by the user.

In any event, once a user is authorized to access the platform, either by having an up-to-date subscription or by otherwise having an active account within the system 600, the method provides access to the platform (740), typically by way of a user interface device 610*a*, 610*b*, as discussed above.

Once a user has accessed the system 600, they may, optionally, be presented with a selection of games of chance to play, or they may be presented with a variety of games within a single game of chance from which they can choose. Choosing a game would then give a user access to that game in order to implement an instance of a randomized gameplay.

Once a user accesses the system 600, or once the user chooses a game to play, the method may then determine the user's position within the context of the game of chance (at 760). This may be by evaluating the user's balance to determine whether they have a positive or negative balance relative to deposits. Accordingly, if the user's current balance reflects a total greater than total deposits, the user would be determined to have a positive balance, while if the user's current balance reflects a total less than total deposits, the user would be determined to have a negative balance.

While the user's position is described herein as either having a positive balance or negative balance, other measurements of a user's position are contemplated as well. Accordingly, while a positive or negative balance may be appropriate where the system 600 implements a game of chance having 0% house advantage, implementations having a positive house advantage may determine a user's position by comparing their current balance against an expected balance, rather than against total deposits.

In any event, once a user's position within the game is determined (at 760), a results set may be defined as active (at 770). Accordingly, in an embodiment where the user's position within the context of the game is determined (at 760) based on whether the user's overall balance is positive or negative, the first potential game results set (defined at 710) may be defined as active when the user's overall balance is positive, and the second potential game results set (defined at 720) may be defined as active when the user's overall balance is negative.

Accordingly, where a target overall house advantage is 0%, a user would generally be expected to achieve a 100% return to player over time. However, at any given time, that user has won or lost previous games resulting in either a positive or negative balance. As discussed in more detail below, such winnings or losings can build up over time, resulting in a user's balance varying significantly from their total deposits.

In the method described here, if the user's balance is determined to be positive (at 760), then the first potential game results set is defined as active (at 770) which applies pressure to the game results to return the user's balance towards the sum total of their deposits. The outcome of such pressure is shown, for example, in FIG. 4. Similarly, when the user's balance is determined to be negative (at 760), the second potential game results set is defined as active (at 770) which applies pressure to the game results in the opposite direction to return the user's balance towards the sum total of their deposits. The outcome of such pressure is shown, for example, in FIG. 5.

In embodiments in which a third potential game results set is defined (at 725), such a third set may be equal to the target overall house advantage. As such, when a user creates a new account, the third set may be defined as active (at 770), since the user's balance is exactly equal to their deposits. Similarly, if a player's balance ever returns to being exactly equal to their deposits, the third set may be defined as active.

In some embodiments, where a third potential game results set is defined (at 725), the third set may be defined as active (at 770) if the user's balance is either exactly equal to their deposits or if the user's balance is within some threshold amount of their deposits, such as within 1% or 2%.

In embodiments of the method, a user may initiate multiple instances of a game of randomized gameplay in sequence. In such embodiments, when the system determines a user position in a game (at 760) and then defines a results set as active (at 770), the user may already have a results set previously defined as active. As such, the system may make a direct determination of the user's position within the game, as discussed above, and then define a results set as active (at 770) based on the user's position. In the example discussed above, the first potential game results set may then be defined as active when the user's overall balance is positive and the second potential game results set may be defined as active when the user's overall balance is negative. Alternatively, in some embodiments, the system may further determine an amount by which the user's overall balance is positive or negative, or in the case of a target overall house advantage different than 0%, an amount by which the user's overall balance differs from an expected balance. In such embodiments, the active game results set may be changed from a previously defined active results set only when the user's overall balance is positive or negative by more than a threshold amount and where the active game results set previously defined is different than the active game results set indicated by or implied by the user's current balance.

Once a specific results set is defined as active (at 770), the method receives instructions to initiate an instance of the randomized gameplay (at 780) from the user. The system then initiates such an instance of randomized gameplay (at 790). Such an implementation may be, for example, by displaying to a user an animation related to the gameplay associated with the selected game while the method determines an appropriate result based on the active results set. For example, if the gameplay selected by the user is a virtual slot machine, the method may present to the user an animation of a slot machine actively spinning. Once the method determines an appropriate outcome for the user based on the active results set, the animation may then return a result based on the active results set (at 800) by showing the slot machine arriving at the determined results by way of an animation.

Once the result is returned to the user (at 800), such a result is incorporated into the user's records and their balance is updated (at 810). Accordingly, if the user wins their wager, an appropriate amount is added to their balance, while if the user loses their wager, an appropriate amount is subtracted from their balance.

In some embodiments, the user is then presented with an option to play again (at 820). The user could then exit the platform or choose to play again. While the embodiment shown shows the user returning to the same specific game played in the previous iteration, and therefor proceeds to determine the user's position within the game (at 860), the user could similarly return to an access point for the platform as a whole (at 240) and, in embodiments where such a selection is presented, select a different game for a following instance of randomized gameplay (at 750).

In any event, after a user chooses to play an additional iteration of an instance of a randomized gameplay (at 820), the method once again determines the user's position within the context of the game of chance (at 760), now based on the user's balance already updated based on the previous results (at 810). The method defines a potential game results set as active (at 770) based on the results of such a determination (at 760) and then receives instructions to initiate an instance of randomized gameplay (at 780. The method then initiates such an instance of randomized gameplay (at 790) and returns results of the instance (at 800) based on the potential game results set defined as active.

Such iterations may take place repeatedly, and for each such iteration, a new determination of the user's position within the game (760) may be executed.

It will be understood that various modifications to the method described may be implemented. For example, in the embodiment described herein, a target overall house advantage may be 0%, and in such a scenario, a deflationary results set may provide a house advantage of 2%, as shown in FIG. 4 while an inflationary results set may provide a house advantage of −2% as shown in FIG. 5. This approach provides symmetric results, such that the system applies pressure to move user account balances towards a neutral condition as an equal rate when the user has a positive or negative balance. However, in some embodiments, asymmetric pressure may be applied by modifying the house advantage in these results sets. Accordingly, in some embodiments, the inflationary results set may provide a house advantage of −2% while a deflationary results set may provide a house advantage of 5%.

Similarly, while the plurality of potential game results sets shown and described comprise either two potential game results sets or three potential game results sets for any particular game, it will be understood that some embodiments provide additional game results sets. Accordingly, in some embodiments, additional game results sets may be provided to provide a house advantage that differs more from the target overall house advantage where a user account strays more than expected. Accordingly, where the first and second potential results sets may provide house advantages of 2% and −2% respectively, and a third potential results set may provide a 0% house advantage, fourth and fifth potential results sets may be provided having, for example, a 5% and −5% house advantage respectively in order to apply increased pressure in certain scenarios.

Figure 8:
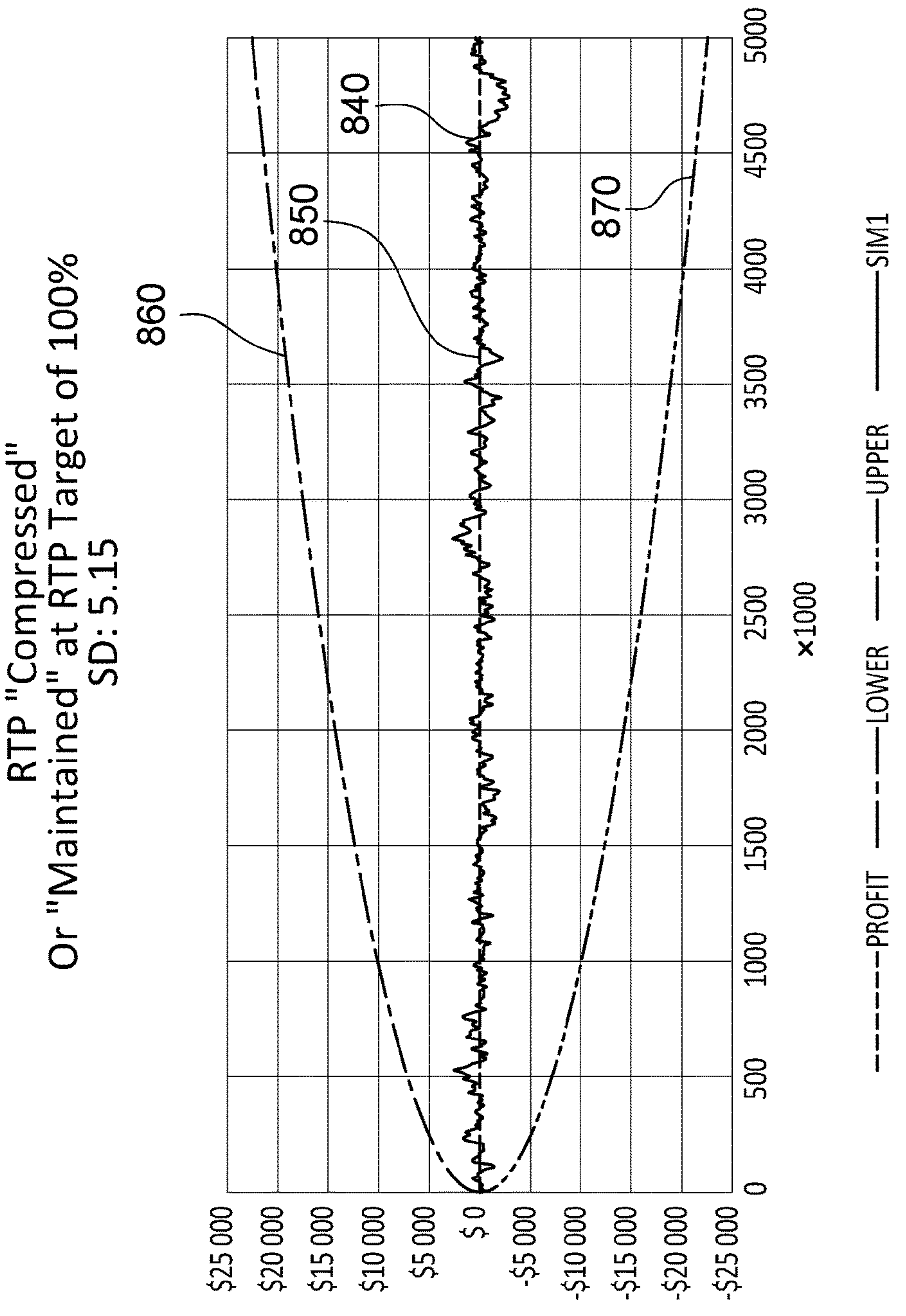
FIG. 8 shows a set of potential outcomes for an implementation of a game of chance in accordance with this disclosure.

FIG. 8 shows a potential outcome for an implementation of a game of chance in accordance with this disclosure. As shown, by switching between deflationary and inflationary results sets which generate outcomes such as those shown in FIGS. 4 and 5 respectively, a simulated user 840 is kept much closer to a target expected value 850 instead of drifting within the larger envelop defined by the upper bound 860 and the lower bound 870.

Accordingly, in the graph shown, as the RTP ran over 100% a period of 98% was introduced until the RTP dropped below or reached 100%. Likewise, when the RTP dropped below the breakeven line, a period of 102% was sustained until that line was crossed or reached. At exactly 100% a third "neutral" set of 100% RTP was used. From both the player and the house's perspectives wins and losses were occurring as usual, but all decay and growth was eventually reduced to negligible repeatedly.

Figure 3A:
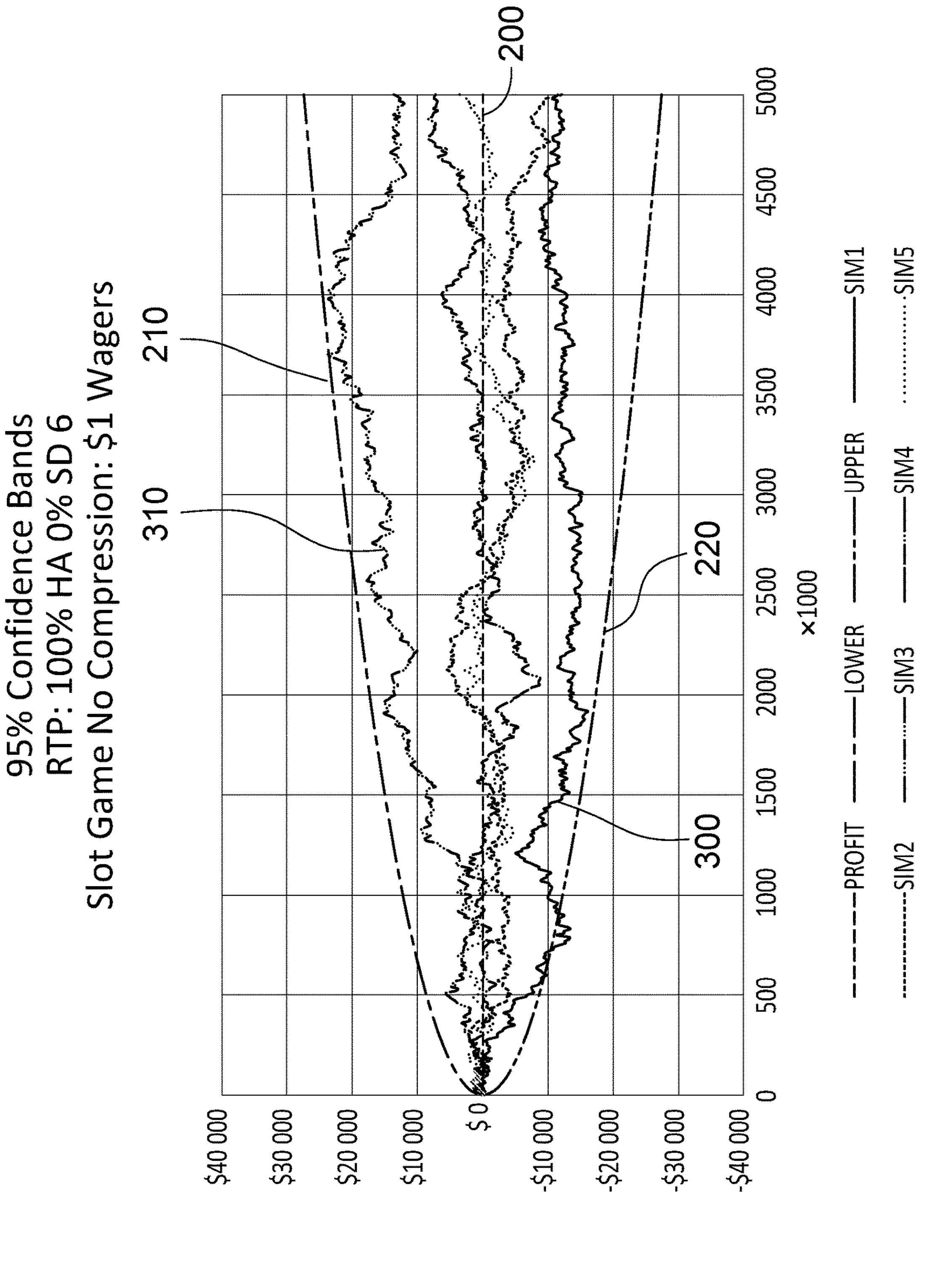
FIGS. 3A and 3B show sets of potential outcomes for different games falling within corresponding envelopes.
Figure 3B:
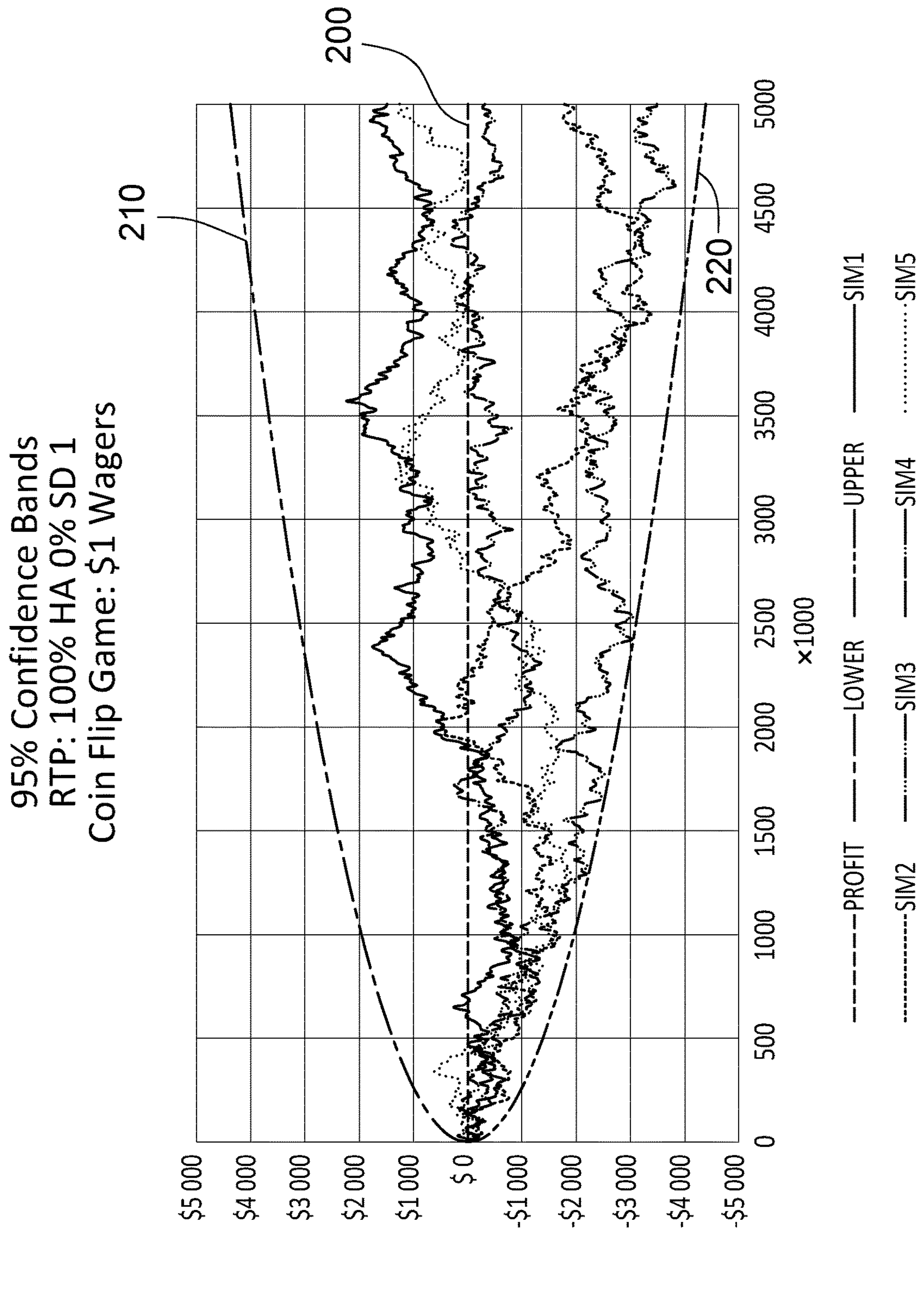
Figure 9:
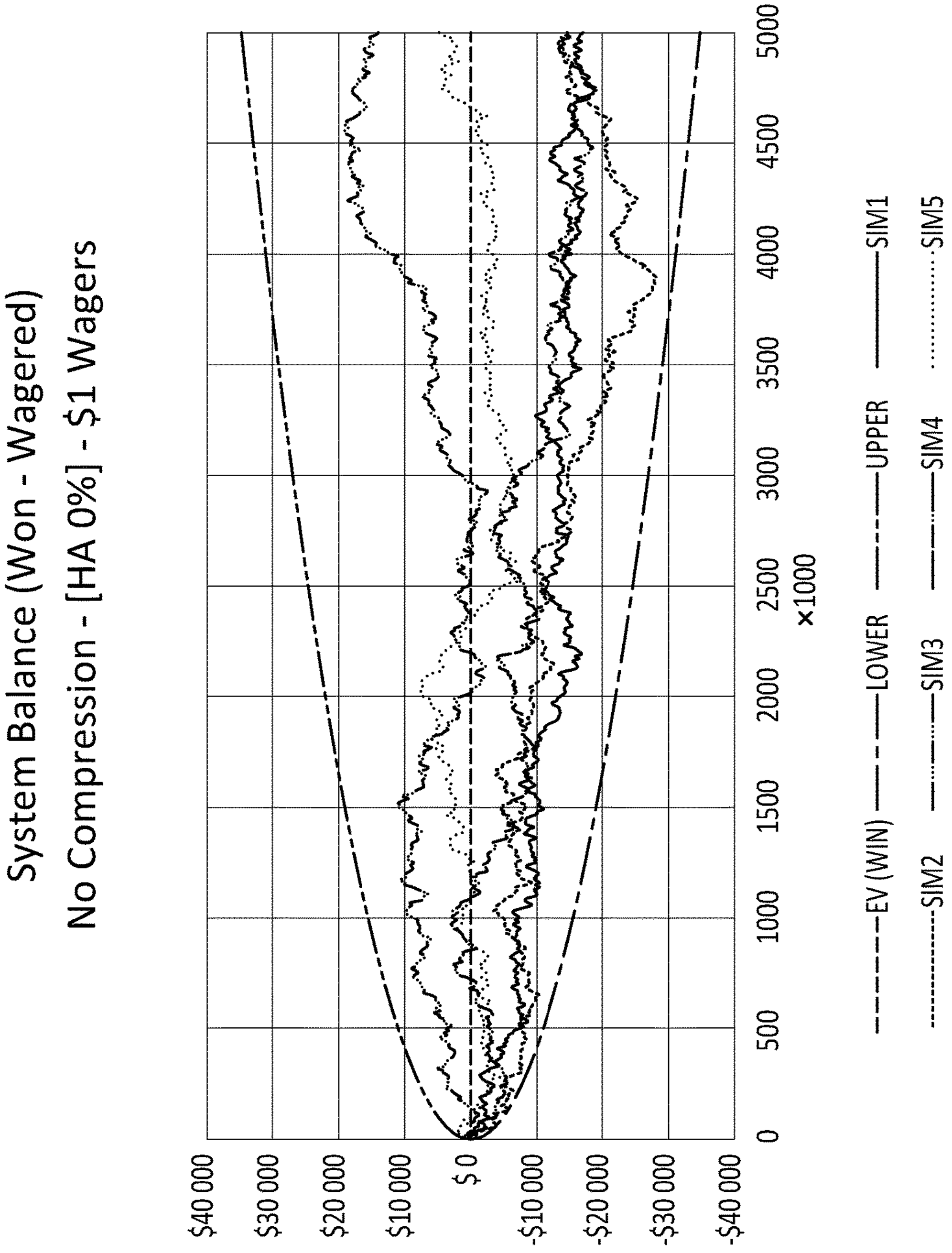
FIG. 9 shows a system balance within the envelope of FIG. 4.

FIG. 9 shows a system balance within the envelope of FIG. 3A. As shown, the system balance for an uncompressed system implementing a 0% house advantage is unpredictable in the same way that results are unpredictable for individual users.

Further, even if all individual users are playing games of chance with outcomes that are individually compressed using the methods described herein, the system as a whole may continue to have unpredictable balances. This is partially because players may stop or quit playing within the system described at any time. Accordingly, individual users may stop playing when ahead such that the system does not have the opportunity to compress their account balance towards their deposits. As such, the overall system balance may be negative.

Figure 10:
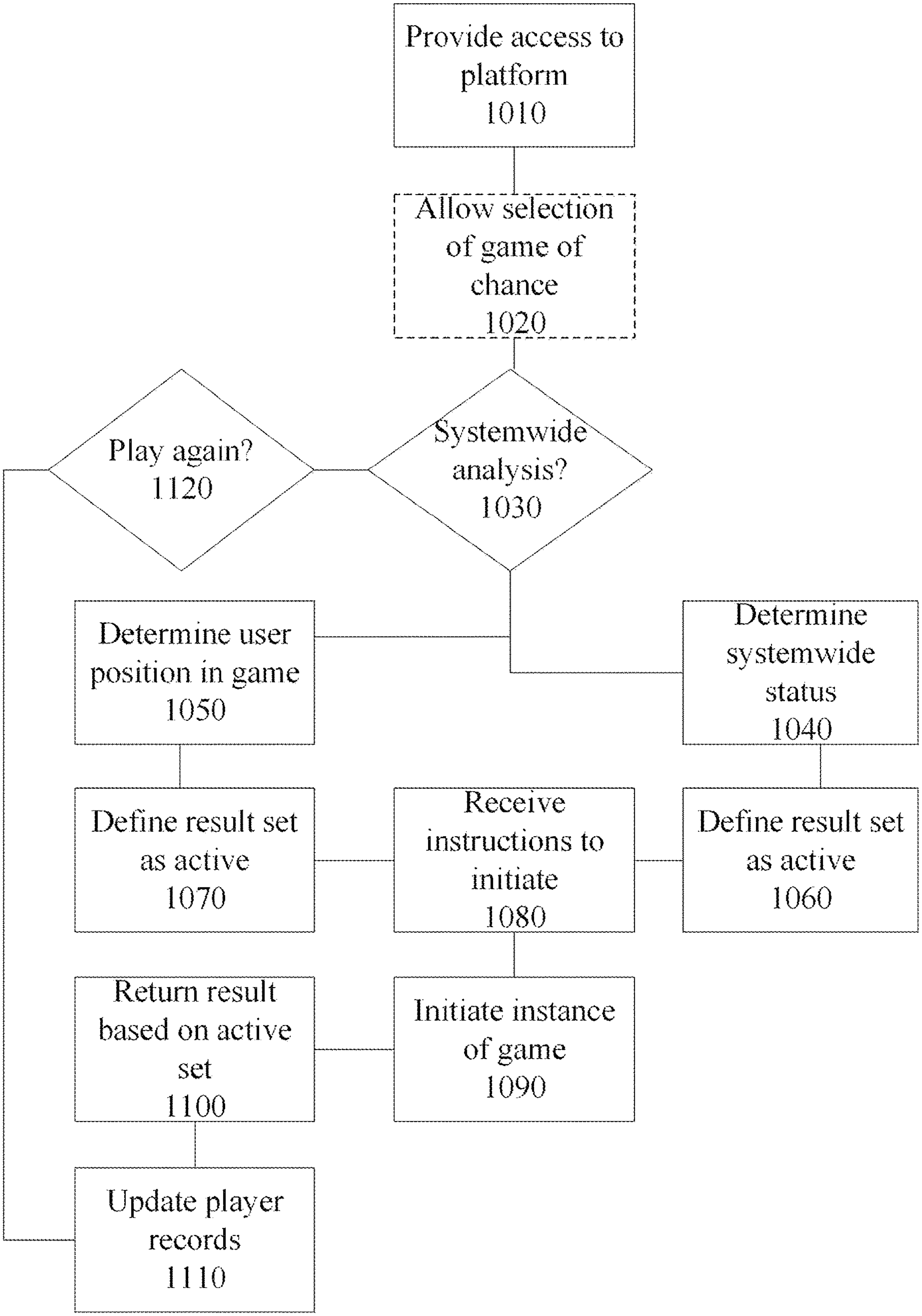
FIG. 10 is a flowchart illustrating a method for conducting a game of chance in accordance with this disclosure.

In such embodiments, a method similar to that discussed above in reference to FIG. 7 may be implemented with a notable difference. As shown in FIG. 10, where the method of FIG. 7 determines a user position within the game (at 760) and then defines a results set as active (at 770) based on the user's position within the game, the method of FIG. 10 adds an additional analysis based on a relationship between an overall system balance and the target overall house advantage.

FIG. 10 is a flowchart illustrating a method for conducting a game of chance in accordance with this disclosure. As shown, once access to the platform is provided (at 1000), the method in some embodiments allows the user to select a particular game of chance to play for a particular instance (at 1010).

Once a user is directed to or selects a particular game from which a particular instance will be executed, the system 600 determines whether for that particular iteration, the method should execute a systemwide analysis (at 1030). This step would determine whether a results set to be defined as active should be based on a systemwide analysis (at 1040) or based on the user's position within the game (at 1050).

Where the system determines (at 1030) that a systemwide analysis should be implemented, the system may evaluate the systemwide status in a manner similar to that discussed above with respect to individual users of the system. As such, the method may determine whether a systemwide balance is greater than or less than a sum of deposits within the system (at 1040). The system may then define a results set as active (at 1060) based on the results of such a systemwide determination. Accordingly, where the system as a whole has a negative balance, the system may implement a deflationary results set, such as a results set that generates the results shown in FIG. 4 in order to implement a positive house advantage. Similarly, where the system as a whole has a positive balance, the system may implement an inflationary results set, such as a results set that generates the results shown in FIG. 5.

If the system determines (at 1030) that a systemwide analysis should not be implemented, the system then instead determines the user's position within the game (at 1050) in much the same way as discussed above with respect to FIG. 7 and defines a results set as active accordingly (at 1070).

The determination of whether such a systemwide analysis should be executed (at 1030) may be based on a number of factors. For example, in some embodiments, it may be based on how many iterations of the instances of randomized gameplay have been initiated by a particular user. Accordingly, in some embodiments, while the determination of which results set to define as active is typically based on the user's position within the game (at 1050), every nth iteration of the user initiating a game within the system would lead the system to make a systemwide analysis (at 1030). As such, the system 600 may maintain an overall count of how many instances of randomized gameplay have been initiated by a user.

Similarly, the system 600 may make the determination of whether to implement a systemwide analysis (at 1030) on a systemwide basis. As such every nth iteration of any instance of randomized gameplay within the system may trigger a definition of an active results set (at 1060) based on systemwide status (at 1040).

In such embodiments, n is typically a variable defined prior to initiation of an instance of the randomized gameplay. Such a variable may be permanently defined systemwide, such that, for example, every $20^{th}$ iteration of gameplay results in an active results set defined by systemwide status, or the variable itself may be based on systemwide status. For example, if the systemwide balance strays further from the target overall house advantage, the value of n may be reduced in order to cause the system to base its selection on systemwide status more frequently.

Once a results set is defined as active based on either the systemwide status or the user position within the game (at 1060 or 1070 respectively), the method proceeds in much the same manner as that discussed above with respect to FIG. 7. The method then receives instructions to initiate an instance of randomized gameplay (at 1080) from the user and then initiates such an instance (at 1090). The method then determines an appropriate outcome for the user based on the active results set (at 1100) and updates the players records (at 1110).

If the user then chooses to play again (at 1120), the system then once again determines if a systemwide analysis should be made (1030) prior to defining a results set as active based on the updated player records.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A computer-based method for conducting games of chance, the method comprising:

defining a target overall house advantage for a game of chance, the game of chance comprising multiple instances of a randomized gameplay;

defining a first potential game results set for generating randomized results defining a house advantage greater than the target overall house advantage;

defining a second potential game results set for generating randomized results defining a house advantage less than the target overall house advantage;

determining a position of a user in the context of the game of chance;

defining one of the first potential game results set and the second potential game results set as active based on the position of the user;

receiving instructions from the user to initiate an instance of the randomized gameplay;

returning to the user a result of the instance of the randomized gameplay based on the active potential game results set, and repeatedly determining the position of the user in the context of the game of chance, defining one of the first potential game results set and the second potential game results set as active based on the position of the user, receiving instructions from the user to initiate an instance of the randomized gameplay, and returning to the user a result of the instance of the randomized gameplay based on the active potential game results set, the result impacting the position of the user following the instance of the randomized gameplay.

2. The computer-based method of claim 1, wherein for a subset of iterations of gameplay initiated based on instructions from the user, the active potential game results set is selected based on a relationship between a system balance and the target overall house advantage.

3. The computer-based method of claim 2, wherein the subset of iterations constitutes every nth iteration, where n is a variable defined prior to initiation of an instance of the randomized gameplay.

4. The computer-based method of claim 1, wherein the target overall house advantage is 0%.

5. The computer-based method of claim 1, wherein the user has an overall balance, and the user's position within the context of the game of chance is based on whether the user's overall balance is positive or negative.

6. The computer-based method of claim 5, wherein the first potential game results set is defined as active when, upon determining the position of the user, the user's overall balance is positive and the second potential game results set is defined as active when, upon determining the position of the user, the user's overall balance is negative.

7. The computer-based method of claim 6 wherein the active game results set is changed only when the user's overall balance is positive or negative by more than a threshold amount and where the active game results set previously defined is different than the active game results set indicated by the user's current balance.

8. The computer-based method of claim 1 further comprising receiving a subscription fee from the user prior to receiving instructions from the user to initiate an instance of the randomized gameplay; and providing access to the user at a user interface through which the user can submit instructions to initiate an instance of the randomized gameplay only when the user has an active subscription.

9. The computer-based method of claim 8 further comprising receiving funds from the user for an account associated with the user, wherein funds from the account are used by the user for wagering on instances of the randomized gameplay, wherein funds in the account are independent of the subscription fee.

10. The computer-based method of claim 9 wherein the target overall house advantage is 0%.

11. The computer-based method of claim 1 further comprising defining a third potential game results set for generating randomized results defining a house advantage corresponding to the target overall house advantage, and initially defining the third potential game results set as active prior to the user having a position within the context of the game.

12. The computer-based method of claim 11 wherein the third potential game results set is defined as active where the user's overall balance is positive or negative by less than a threshold amount.

13. The computer-based method of claim 1, wherein the first potential game results set defines a house advantage greater than the target overall house advantage by a first amount and the second potential game results set defines a house advantage less than the target overall house advantage by a second amount different than the first amount.

14. The computer-based method of claim 1, wherein each of the potential game results sets is a formula for determining outcomes of an instance of the game of chance.

15. The computer-based method of claim 1, wherein each of the potential game results sets is an array or matrix of potential outcomes for an instance of the game of chance, and wherein a result is selected randomly from the array or matrix.

16. A gaming system for providing access to a game of chance, the system comprising:

a user interface device through which a user may access a game of chance, the game of chance comprising multiple instances of a randomized gameplay;

a memory for storing instructions for implementing the game of chance;

a database containing a plurality of potential game results sets for the instances of the randomized gameplay; and a processor for implementing the game of chance based on the instructions stored in the memory and generating a randomized outcome for each instance of the randomized gameplay based on one of the plurality of potential game results sets, wherein the game of chance has a target overall house advantage, wherein each of the plurality of potential game results sets generates a randomized result for particular instances of the randomized gameplay of the game of chance, such that a first of the plurality of potential game results sets generates randomized results defining a house advantage greater than the target overall house advantage, and a second of the plurality of potential game results sets generates randomized results defining a house advantage less than the target overall house advantage, wherein the user has a position within the context of the game of chance, and wherein one of the plurality of potential game results sets is defined as active based on the user's position, wherein for each instance of the randomized gameplay initiated from the user interface device, the processor implements the game of chance based at least partially on the active potential game results set at the time at which the instance is initiated, and wherein the processor implements the game of chance repeatedly, and for each repeated implementation, the processor determines the position of the user within the context of the game of chance, defines one of the potential game results sets as active based on the position of the user, receives instructions from the user to initiate an instance of the randomized gameplay, and returns to the user a result of the instance of the randomized gameplay based on the active potential game results set, wherein the result of the instance of the randomized gameplay impacts the position of the user following the instance of the randomized gameplay.

17. The gaming system of claim 16, wherein the target overall house advantage is 0%.

18. The gaming system of claim 16, wherein the user's position within the context of the game of chance is based on whether the user's overall balance is positive or negative, and wherein the first potential game results set is defined as active when the user's overall balance is positive and the second potential game results set is defined as active when the user's overall balance is negative.

19. The gaming system of claim 16, wherein for a subset of instances of randomized gameplay, the potential game results set is selected based on a relationship between a system balance and the target overall house advantage.

20. The gaming system of claim 16, wherein the user is provided access to the game of chance at the user interface only if the user has an active subscription to a service implementing the game of chance, and wherein the game of chance accepts wagers for instances of the randomized gameplay from a user account independent of a fee for maintaining an active subscription.

21. The gaming system of claim 16, wherein each of the plurality of potential game results sets is a formula for determining outcomes of an instance of the game of chance or an array or matrix of potential outcomes for an instance of the game of chance, and wherein a result is determined based on the formula or selected randomly from the array or matrix.

* * * * *